United States Patent
Sung et al.

(10) Patent No.: US 8,057,937 B2
(45) Date of Patent: **\*Nov. 15, 2011**

(54) HYBRID BATTERY

(75) Inventors: Do Kyong Sung, Gyeonggi-do (KR); Jun Tae Jung, Gyeonggi-do (KR)

(73) Assignee: Vina Technology Co., Ltd., Gunpo-si, Gyeonggi-do (KR)

( * ) Notice: Subject to any disclaimer, the term of this patent is extended or adjusted under 35 U.S.C. 154(b) by 777 days.

This patent is subject to a terminal disclaimer.

(21) Appl. No.: 12/094,018

(22) PCT Filed: Jun. 14, 2006

(86) PCT No.: PCT/KR2006/002267
§ 371 (c)(1),
(2), (4) Date: May 16, 2008

(87) PCT Pub. No.: WO2007/058421
PCT Pub. Date: May 24, 2007

(65) Prior Publication Data
US 2008/0318135 A1    Dec. 25, 2008

(30) Foreign Application Priority Data
Nov. 16, 2005 (KR) .................. 10-2005-0109431

(51) Int. Cl.
*H01M 10/056* (2010.01)
*H01M 10/0568* (2010.01)
*H01M 12/00* (2006.01)
*H01G 9/035* (2006.01)

(52) U.S. Cl. ..... 429/324; 429/339; 429/199; 429/231.8; 361/505

(58) Field of Classification Search ............... None
See application file for complete search history.

(56) References Cited

U.S. PATENT DOCUMENTS

| | | | | |
|---|---|---|---|---|
| 6,059,847 | A * | 5/2000 | Farahmandi et al. | 29/25.03 |
| 6,252,762 | B1 | 6/2001 | Amatucci | |
| 7,656,645 | B2 * | 2/2010 | Chiba | 361/502 |
| 7,911,767 | B2 * | 3/2011 | Sung et al. | 361/502 |

FOREIGN PATENT DOCUMENTS

| | | | |
|---|---|---|---|
| JP | 2005-139100 | * | 6/2005 |
| WO | WO 03/088373 A2 | | 10/2003 |
| WO | WO 2004/082059 A1 | | 9/2004 |
| WO | WO 2005/088656 | * | 9/2005 |

* cited by examiner

*Primary Examiner* — Jonathan Crepeau
(74) *Attorney, Agent, or Firm* — Lowe Hauptman Ham & Berner LLP

(57) ABSTRACT

Disclosed herein is a hybrid battery using an electrochemically stable electrolyte composition and electrodes suitable for use in the electrolyte composition. The hybrid battery is non-toxic and highly stable, and has improved high-current charge/discharge characteristics.

The hybrid battery comprises an electrode unit consisting of an anode and a cathode, a separator for electrically separating the anode and the cathode, and an electrolyte filled in a space between the anode and the cathode so as to form an electric double layer on surfaces of the anode and cathode when a voltage is applied wherein the electrolyte contains a mixture of a lithium salt, an ammonium salt and a pyrrolidinium salt as solutes in a carbonate-based solvent so that the solute mixture has a concentration of 1.0-2.5 mol/L.

14 Claims, 6 Drawing Sheets

FIG. 5
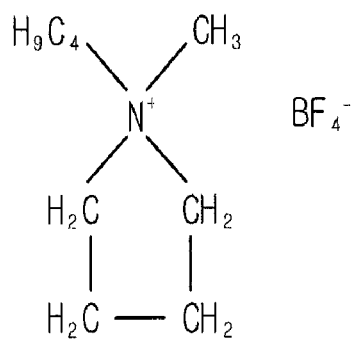
Butylmethylpyrrolidinium
tetrafluoroborate
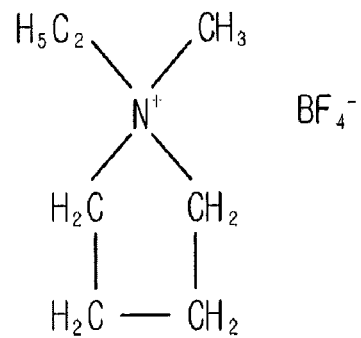
Ethylmethylpyrrolidinium
tetrafluoroborate
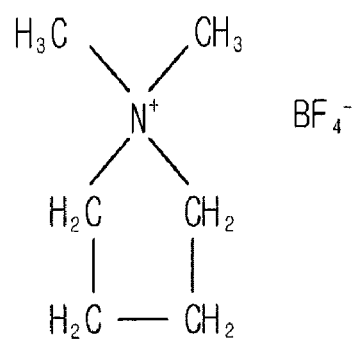
Dimethylpyrrolidinium
tetrafluoroborate

HYBRID BATTERY

This application is a U.S. National Phase of International Patent Application Ser. No. PCT/KR2006/002267, filed 14 Jun. 2006 which claims priority to Korean Patent Application No. 10-2005-0109431 filed 16 Nov. 2005.

TECHNICAL FIELD

The present invention relates to a hybrid battery, and more specifically to a hybrid battery using an electrochemically stable electrolyte composition and electrodes suitable for use in the electrolyte composition, thereby achieving improved high-current charge/discharge characteristics.

BACKGROUND ART

General capacitors have a structure in which a dielectric is interposed between a pair of electronically conductive electrodes. Capacitors are energy storage devices in which charges are accumulated in proportion to a voltage applied between a pair of electrodes.

Of these capacitors, supercapacitors show battery characteristics and superior discharge characteristics, including instantaneous high current and high power, despite low energy density as compared to common batteries. In addition, supercapacitors can withstand several hundreds of thousands of charge/discharge cycles, indicating a feasible semi-permanent cycle life. Based on these advantages, extensive research and development have been conducted on supercapacitors.

Supercapacitors are divided into the following types: (1) electric double layer capacitors for energy storage using an anode and a cathode, both of which are made of activated carbon, to form an electric double layer; and (2) hybrid batteries for energy storage using a first electrode made of a material capable of storing charges by electrical redox reactions and a second electrode made of an electric double layer capacitor material.

Since the electric double layer charge storage in the second electrode takes place by physical adsorption and desorption of ions arising from an electric potential, the reaction rate is very high and the charge/discharge cycle life is significantly extended while the storage capacity (or energy density) is lowered.

On the other hand, since the charge storage in the first electrode takes place in a bulk portion rather than on surfaces by electrical redox reactions, the reaction rate is low in materials for secondary batteries but the energy storage capacity is 10 times higher than that in the electric double layer charge storage.

The hybrid batteries are energy storage devices that use a material for a secondary battery as a material for the first electrode and an electric double layer capacitor material as a material for the second electrode. Accordingly, such constitution of the hybrid batteries overcomes low capacity, which is a disadvantage of electric double layer capacitors, and short cycle life and low power density, which are disadvantages of secondary batteries. According to the state of the art, hybrid batteries have about two-fold higher energy density than electric double layer capacitors, and ensure a cycle life of 10,000 cycles or more.

The hybrid batteries are largely classified into the following systems: (1) systems that use an anode made of a metal oxide material, e.g., lithium manganate, for a secondary battery, and a cathode made of activated carbon, which is used in electric double layer capacitors; (2) systems that use an anode made of activated carbon and a cathode made of graphite or mesocarbon microbeads (MCMB), which are used in secondary batteries. The systems (2) in which activated carbon is used as a material for an anode and graphite is used as a material for a cathode, are currently being developed for many applications because they have a working voltage of a maximum of 4 V and exhibit excellent cycle characteristics and high-temperature characteristics. However, the systems (2) have a problem in that a large excess of lithium must be added to activate the cathode, making it difficult to manufacture the systems (2) on an industrial scale.

In the systems (1) in which lithium manganate is used as a material for an anode and activated carbon is used as a material for a cathode, the use of an aprotic solvent, such as acetonitrile (AN) or propylene carbonate (PC), as a solvent for an electrolyte is under consideration, and mixed salts of tetraethylammonium tetrafluoroborate ($TEABF_4$) and lithium tetrafluoroborate ($LiBF_4$), etc. are used as salts of the electrolyte. Particularly, only one salt is not used, but two salts are used in hybrid batteries. The reason for the use of two salts, such as lithium tetrafluoroborate and tetraethylammonium tetrafluoroborate, in hybrid batteries is that energy is stored in an anode by intercalation/deintercalation of Li ions ($Li^+$) while energy is stored in a cathode by adsorption/desorption of TEA ions ($TEA^+$).

FIG. 1 is a graph showing the conditions of a cycle test for a hybrid battery specified by the US Department of Energy (DOE), and FIG. 2 is a graph showing changes in capacity according to the kind of electrolytes used in hybrid batteries under the test conditions shown in FIG. 1.

With reference to FIG. 1, in accordance with the procedure proposed by the US DOE, a cycle test for a hybrid battery is conducted by continuously repeating a cycle consisting of charging from ½ Vw (working voltage) to Vw for 20 seconds at a charge/discharge current of 50 mA/F, maintaining at Vw for 10 seconds, discharging from Vw to ½ Vw for 20 seconds, and maintaining at ½ Vw for 10 seconds.

In FIG. 2, for example, the cycle life of hybrid batteries is measured at a working voltage (Vw) of 2.5 V and a charge/discharge current of 50 mA/F. Specifically, the cycle life is measured under the output conditions by continuously repeating a cycle (60 seconds) consisting of charging from 1.25 V to 2.5 V for 20 seconds, maintaining at 2.5 V for 10 seconds, discharging from 2.5 V to 1.25 V for 20 seconds, and maintaining at 1.25 V for 10 seconds.

The graph of FIG. 2 compares the use of propylene carbonate with the use of acetonitrile as a solvent of an electrolyte under the test conditions shown in FIG. 1. For the experiments of FIG. 2, $LiMn_2O_4$ was used as a material for an anode and activated carbon was used as a material for a cathode to manufacture capacitors. 1 M lithium tetrafluoroborate ($LiBF_4$) and 1 M tetraethylammonium tetrafluoroborate ($(C_2H_5)_4NBF_4$) were used as solutes of an electrolyte when acetonitrile was used as a solvent of the electrolyte, while 0.75 M lithium tetrafluoroborate ($LiBF_4$) 0.75 M and 0.75 tetraethylammonium tetrafluoroborate ($(C_2H_5)_4NBF_4$) were used as solutes of an electrolyte when propylene carbonate was used as a solvent of the electrolyte.

The graph of FIG. 2 shows that about 90% of the initial capacity was maintained after 10,000 cycles when acetonitrile was used as a solvent of an electrolyte, whereas only 70% or less of the initial capacity was maintained after 10,000 cycles when propylene carbonate was used as a solvent of an electrolyte.

This difference in the decrease in capacity is attributed to the fact that the carbonate material has a low electrical conductivity, a low solubility for the salts and a high possibility of redox reactions at high temperatures when compared to acetonitrile.

Acetonitrile can be used to manufacture high-power hybrid batteries because of its low viscosity and high solubility for salts. Accordingly, acetonitrile is suitable for use as a solvent of an electrolyte. However, acetonitrile has a low boiling point of about 82° C., is highly flammable, and has a high probability of forming cyanide when a fire occurs. Particularly, when it is intended to design large-scale products, heating to 140° C. or higher results in sublimation of electrolytes present in the products, thus risking the danger of sudden explosion. In addition, acetonitrile is an organic cyanide compound classified into categories of toxic substances, and therefore, there is a limitation in use from a standpoint of technical design valuing environmental stability.

Propylene carbonate is widely used as a solvent of an electrolyte due to its non-toxicity, safety and high boiling point. However, propylene carbonate has a higher resistance and a lower solubility for salts than acetonitrile. Accordingly, there is a limitation in using propylene carbonate in the manufacture of large-sized products requiring high power and low resistance.

Thus, there is a need for a hybrid battery using a carbonate-based solvent, which is more stable than acetonitrile, as a solvent of an electrolyte, thereby achieving improved high-power and cycle characteristics.

DISCLOSURE

Technical Problem

It is one object of the present invention to provide a non-toxic and highly stable hybrid battery using an electrochemically stable electrolyte composition and electrodes suitable for use in the electrolyte composition, thereby achieving improved high-current charge/discharge characteristics.

It is another object of the present invention to provide a hybrid battery using a mixture of an ammonium salt and a pyrrolidinium salt, which are organic cationic salts, as solutes of an electrolyte to increase conductivity and concentration required in the electrolyte, thereby achieving improved cycle characteristics.

It is another object of the present invention to provide a hybrid battery using a highly soluble and highly flowable imide salt as a solute of an electrolyte, thereby achieving enhanced high-temperature stability, improved withstand voltage characteristics and reduced self-discharge rate.

It is yet another object of the present invention to provide a hybrid battery using at least one carbonate-based solvent having a high dielectric constant and a high conductivity as a solvent of an electrolyte to increase the concentration of the electrolyte, so that a decrease in capacity and an increase in resistance can be reduced.

Objects to be accomplished by the present invention are not limited to the above-mentioned objects, and other objects that are not mentioned above would be obviously appreciated to those skilled in the art from the following detailed description.

Technical Solution

In accordance with an aspect of the present invention for achieving the above objects, there is provided a hybrid battery comprising an electrode unit consisting of an anode and a cathode, a separator for electrically separating the anode and the cathode, and an electrolyte filled in a space between the anode and the cathode so as to form an electric double layer on surfaces of the anode and cathode when a voltage is applied wherein the electrolyte contains a mixture of a lithium salt, an ammonium salt and a pyrrolidinium salt as solutes in a carbonate-based solvent so that the solute mixture has a concentration of 1.0-2.5 mol/L.

Details of other aspects and embodiments of the present invention are illustrated in the detailed description and accompanying drawings.

Advantages and features of the present invention and achievements thereof same will become apparent with reference to the embodiments described in detail below in conjunction with the accompanying drawings. However, the present invention may be embodied in different forms and is not to be construed as being limited to the embodiments. Rather, these embodiments are provided so that this disclosure will be thorough and complete, and will fully convey the scope of the invention to those skilled in the art. Therefore, the present invention is defined only by the appended claims. The same reference numbers will be used throughout the drawings to refer to the same or like parts.

In the drawings, the dimensions and thicknesses of layers and films or regions are exaggerated for the sake of clarity of the specification. If it is described in the specification that one layer or film is formed "on" another layer or film, the one layer may exist immediately on the another layer or film or a third layer or film may be intervened between the two layers.

DESCRIPTION OF DRAWINGS

The above and other objects, features and other advantages of the present invention will be more clearly understood from the following detailed description taken in conjunction with the accompanying drawings, in which:

FIG. 5 shows chemical structures of ethylmethylpyrrolidinium tetrafluoroborate, butylmethylpyrrolidinium tetrafluoroborate and dimethylpyrrolidinium tetrafluoroborate used in Examples of the present invention;

BEST MODE

Figure 3:
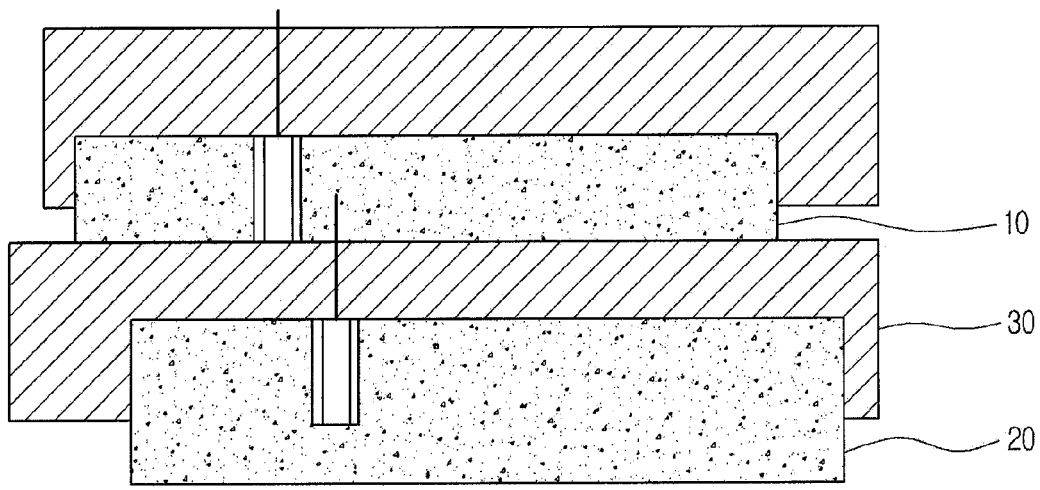
FIG. 3 is a diagram schematically showing the structure of a hybrid battery according to the present invention.

FIG. 3 is a diagram schematically showing the structure of a hybrid battery according to the present invention. Hereinafter, the constitution of the hybrid battery will be explained with reference to FIG. 3.

Referring to FIG. 3, the hybrid battery comprises an electrode unit consisting of an anode 10 and a cathode 20, a separator 30 for separating the electrodes 10 and 20, and an electrolyte forming an electric double-layer on contact surfaces between the electrodes 10 and 20 and the separator 30 while being in contact with the electrodes 10 and 20.

Each of the electrodes is produced in accordance with the following procedure. First, an electrode material, a conductive material, a binder and a solvent are mixed to prepare a slurry. Thereafter, the slurry is coated to a small thickness on a current collector, such as an aluminum foil, by a conventional technique using a doctor knife applicator. The solvent is evaporated by breeze heating to attach the electrode layer to the current collector.

In some embodiments of the present invention, an etched aluminum foil is used as the current collector. The aluminum foil functions to decrease the resistance and to inhibit an increase in resistance during use.

The anode 10 is made of manganese dioxide ($MnO_2$). More specifically, the anode 10 can be made of a material having superior high-rate charge/discharge characteristics and withstand voltage characteristics. Examples of such anode materials include composite metal oxides, such as lithium manganate ($LiMn_2O_4$) having a spinel structure, lithium cobalt oxide ($LiCoO_2$) having a layered structure, lithium nickel oxide ($LiNiO_2$), and lithium nickel cobalt manganese oxide ($LiMO_2$, M=Ni, Co, Mn, Li or M=Ni, Co, Mn). A high content of cobalt in the composite metal oxides results in poor high-voltage stability. Accordingly, in some embodiments of the present invention, the cobalt content of the composite metal oxides is limited to 33% or lower.

The use of the composite metal oxides offers some advantages in that charging to 4.5 V (vs. $Li/Li^+$) can be stably performed, an increase in voltage is facilitated, and high electrode stability can be attained by the addition of an imide salt.

The cathode 20 may be made of activated carbon having a capacitance of 100 F/g or more (preferably, 100-300 F/g). In addition, the cathode 20 may be made of activated carbon having a specific surface area not less than 1,500 $m^2/g$ and a pore volume not less than 0.5 cc/g.

In the case where the lithium nickel cobalt manganese oxide is used as a material for the anode and activated carbon is used as a material for the cathode, the weight ratio of the lithium nickel cobalt manganese oxide to the activated carbon is adjusted to 1:1.25 taking into consideration the electric charges of the anode and the cathode. Taking into consideration various factors, such as decrease of initial capacity, loss in the capacity of the cathode and loss in capacity by reactions, the weight ratio of lithium nickel cobalt manganese oxide to activated carbon is preferably adjusted between 1:1 and 1:1.4. Taking into consideration the density per volume, the volume ratio of the anode to the cathode is preferably between 1:2 and 1:4. This volume ratio may be varied depending on the volume of pores within the carbon electrode.

In addition, as the conductive material, a powdered conductive material, such as a metal or carbon powder, can be used to increase the conductivity of the electrodes.

10% by weight or more of the conductive material and 5% by weight or more of a binder with respect to the total weight of the anode composition, are mixed together to produce the anode 10. In contrast, 10% by weight of the conductive material and 4% by weight of a binder with respect to the total weight of the cathode composition, are mixed together to produce the cathode 20.

The electrolyte is prepared using a lithium salt capable of anode charging and organic cationic salts capable of cathode charging as solutes, and at least one carbonate-based solvent selected from carbonate materials as a solvent.

The concentration of the electrolyte plays an important role in improving the high-current cycle characteristics of the hybrid battery. Particularly, current research efforts have been directed toward the development of capacitors with a capacity not less than 150 F/g using activated carbon having a pore volume of 0.5 cc/g. Under such circumstances, as many ions as possible must be contained in a given volume of the electrolyte. Accordingly, it is required to increase the concentration of the electrolyte in order to achieve superior capacitor characteristics.

Figure 1:
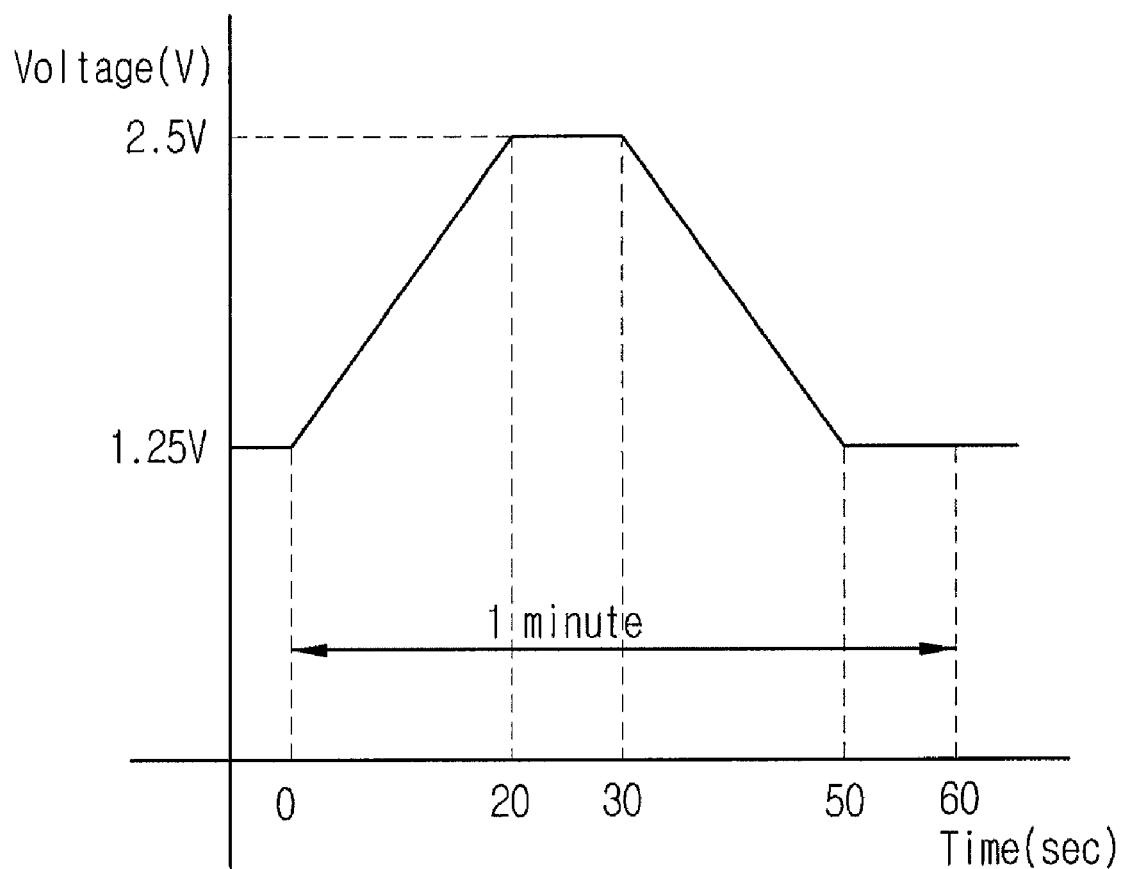
FIG. 1 is a graph showing the conditions of a cycle test for a hybrid battery specified by the US Department of Energy (DOE)
Figure 4:
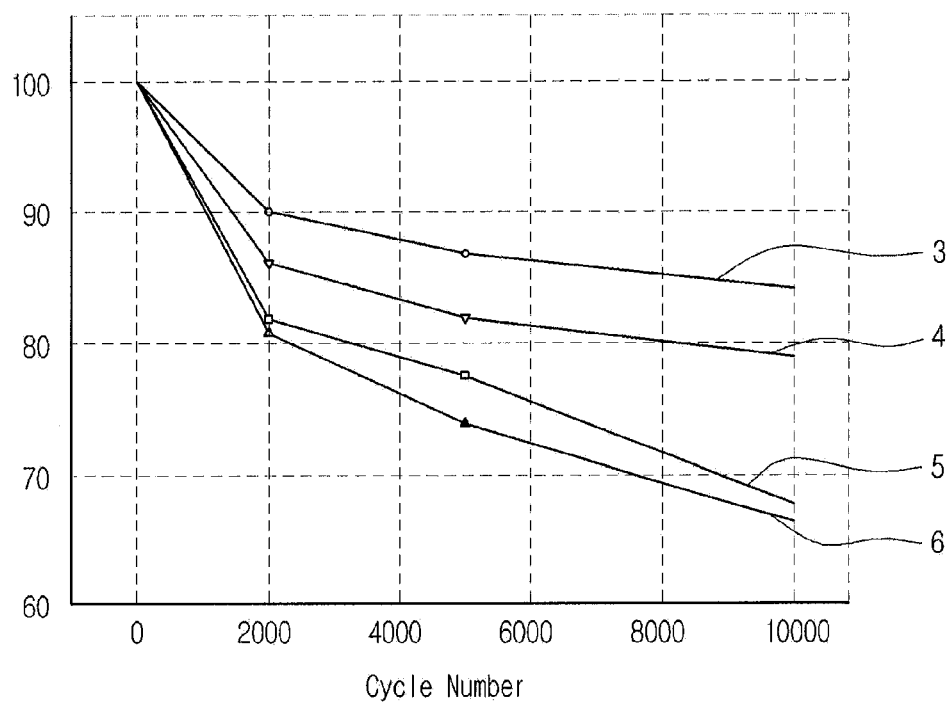
FIG. 4 is a graph showing changes in capacity as a function of concentration of electrolytes used in hybrid batteries under the test conditions shown in FIG. 1.

FIG. 4 is a graph showing changes in capacity as a function of concentration of electrolytes used in hybrid batteries under the test conditions shown in FIG. 1.

FIG. 4 shows a correlation between the concentrations of electrolytes and the cycle characteristics of hybrid batteries. The graph of FIG. 4 shows experimental results obtained after 10,000 cycles of hybrid batteries at a discharge current of 20 mA/F.

An anode was produced by mixing 75% of an anode active material, 15% of carbon black and 10% of PVDF as a binder to prepare a slurry, and coating the slurry to a thickness of 50 μm on both surfaces of a 20 mm-thick aluminum foil so that the anode had a total thickness of 120 μm. A cathode was produced by mixing 75% of a cathode active material, 15% of carbon black and 10% of CMC and PTFE as binders, and coating the mixture to a thickness of 100 μm on both surfaces of a 20 mm-thick aluminum foil so that the cathode had a total thickness of 220 μm. The cathode and the anode were used to manufacture the final hybrid batteries.

At this time, $LiMn_2O_4$ was used as the anode active material, activated carbon was used as the cathode active material, propylene carbonate was used as a solvent of the electrolytes, and a lithium salt was used as a solute of the electrolytes. The concentration of the lithium salt was set to 0.75 mol/L. In order to confirm changes in the capacity of the hybrid batteries according to the changes in the concentration of the hybrid batteries, a methyltriethylammonium salt, which has a higher solubility than a tetraethylammonium salt, were used. The concentrations of the methyltriethylammonium salt were sequentially adjusted to 0.75 mol/L (6), 1.0 mol/L (5), 1.25 mol/L (4) and 1.5 mol/L (3).

As is evident from FIG. 4, as a result of experiments of 10,000 cycles, a decrease in capacity was reduced with increasing concentration of the methyltriethylammonium salt in the hybrid batteries. In addition, the graph of FIG. 4 demonstrates that the presence of an electrolyte at a certain level or above reduced the decrease in the capacity of the hybrid batteries, resulting in a considerable improvement in cycle characteristics. Particularly, when the concentration of the methyltriethylammonium salt was 1.5 mol/L, a decrease in the capacity of the hybrid battery was markedly reduced and a level of 80% or above of the initial capacity was maintained. Meanwhile, when the concentration of the methyltriethylammonium salt was 1.0 mol/L or less (5 or 6), the capacity of the hybrid battery was maintained at a level of 70% or below of the initial capacity.

In addition, the solubility of the electrolyte is determined by various factors, including dielectric constant of the solvent, degree of dissociation of the salts and electrical stability of the salts. In some embodiments of the present invention, the solutes and the solvent of the electrolyte are controlled so that the electrolyte of the hybrid battery has a concentration of 1.25 mol/L or more.

The concentration of the electrolyte is determined by the stability of the solutes and the dielectric constant of the solvent. Accordingly, in some embodiments of the present invention, stable ions having a broad charge density distribution are used so that the concentration of the electrolyte is increased, or the composition of the solutes and the solvent is controlled so that the dielectric constant of the solvent is increased.

The lithium salt used in the electrolyte may be at least one kind selected from lithium salts, for example, lithium tetrafluoroborate, lithium trifluoromethlysulfonimide, lithium perchlorate and lithium hexafluoroborate.

As an organic cationic salt used in Examples of the present invention, an electrochemically stable pyrrolidinium salt may be used. Alternatively, a mixture of a pyrrolidinium salt and an ammonium salt may be used to increase the electrochemical stability of the salts, thereby increasing the concentration of the electrolyte.

Since the pyrrolidinium salt is very electrochemically stable and has characteristics of a highly dissociable ionic liquid, it acts to increase conductivity and concentration of the electrolyte required to improve the high-current charge/discharge and capacity characteristics of the hybrid battery. The pyrrolidinium cationic salt may be at least one kind selected from pyrrolidinium cationic salts, for example, ethylmethylpyrrolidinium, dimethylpyrrolidinium and butylmethylpyrrolidinium.

In addition to the pyrrolidinium salt, an ionic liquid, such as imidazolium, may be further used. However, the ionic liquid, such as imidazolium, has poor high-temperature stability, resulting in some problems, such as evolution of gases in large quantities. Accordingly, in some embodiments of the present invention, a very electrochemically stable and highly soluble pyrrolidinium salt is used as an ionic liquid.

The ammonium salt used in the electrolyte may be at least one kind selected from the group consisting of ammonium salts, for example, tetraethylammonium tetrafluoroborate, ethylmethylimidazolium tetrafluoroborate, tetraethylammonium hexafluoroborate, tetraethylammonium perchlorate and methyltriethylammonium.

In some embodiments of the present invention, a highly soluble and highly flowable imide salt may be used to increase the concentration of the electrolyte.

The imide salt has the moiety $N(C_nF_{2n+1}SO_2)_2^-$, and is used to stabilize the surface of the anode and to prevent deterioration of the characteristics due to dissolution of manganese ions. More specifically, the imide salt serves to form a high-quality coating film on the surface of the anode, resulting in enhanced high-temperature stability, improved withstand voltage characteristics, and decreased self-discharge rate. In addition, since the imide salt is highly soluble in the solvent and is highly dissociable to form an ionic liquid together with a tetraalkylammonium salt, it is responsible for increased solubility in the electrolyte. In addition, when lithium ions coexist with the imide salt, they are highly dissociable in the imide salt. One of the reasons why the manganese compound present in the anode is dissolved is due to a reaction between the manganese compound and hydrogen fluoride (HF), which is a by-product of a reaction between moisture present on the surface of the anode and the salts. The imide salt prevents the reaction between the manganese compound and hydrogen fluoride (HF). Accordingly, the use of the imide salt is particularly effective when lithium manganate ($LiMn_2O_4$) or a composite metal oxide, such as a lithium nickel cobalt manganese oxide ($LiMO_2$, M=Ni, Co, Mn, Li or M=Ni, Co, Mn), is used as an anode material.

The imide salt is lithium trifluoromethylsulfonimide (LiN($CF_3SO_2$)$_2$) or lithium pentafluoroethylsulfonimide (LiN($C_2F_5SO_2$)$_2$), and is preferably used at a concentration not higher than 0.1 M.

It is preferred that the electrolyte have a concentration of 2.5 mol/L or lower. If the concentration of the electrolyte is 2.5 mol/L or higher, the viscosity of the electrolyte is increased and the salts are precipitated at a low temperature, causing the problem of increased resistance of the hybrid battery. Therefore, the concentration of the electrolyte is limited to 2.5 mol/L or lower.

In some embodiments of the present invention, the amounts of the lithium salt and the organic cations, which are factors determining the concentration of the electrolyte, are suitably controlled. Too small an amount of the lithium salt makes it difficult to achieve sufficient capacity of the hybrid battery. Too large an amount of the lithium salt causes reduced conductivity in the electrolyte. While lithium ions are deintercalated during charging and intercalated during discharging, a source of the lithium ions is already present in the electrolyte. Therefore, the concentration of the lithium ions is limited so as not to exceed a certain level. In some embodiments of the present invention, the lithium salt is used at a concentration of 0.7 mol/L or less.

The organic cations other than the lithium salt are preferably used at a concentration of 1.0 mol/L or more. A mixture of pyrrolidinium cations and ammonium cations as the organic cations may be used. In this case, the ammonium salt, which has lower solubility and conductivity than the pyrrolidinium salt, is used at a concentration of 0.8 mol/L or less, and the pyrrolidinium salt is used in such an amount that the concentration of the mixture reaches 1.0 mol/L or more. Alternatively, a pyrrolidinium salt only may be used without using an ammonium salt. In this case, the pyrrolidinium salt is used at a concentration of 1.0 mol/L or more.

As the solvent, there can be used at least one carbonate selected from the group consisting of propylene carbonate (PC), dimethyl carbonate (DMC), diethyl carbonate (DEC) and ethylmethyl carbonate (EMC). A derivative of the carbonate can be used as the solvent.

In some embodiments of the present invention, ethylene carbonate having a relatively high dielectric constant can be added to a carbonate selected from the carbonate-based solvents as the solvent of the electrolyte to increase the concentration of the electrolyte. Ethylene carbonate has a high dielectric constant, a high conductivity and a high melting point. Based on these properties, ethylene carbonate is mixed with other solvents.

Since the dielectric constant of the mixed solution is dependent on the mole fraction of the solvent and an increased amount of ethylene carbonate results in deterioration of low-temperature characteristics, the amount of the ethylene carbonate must be controlled to an optimum level.

Ethylene carbonate is preferably added in an amount of 50 mol % or less and more preferably 20 mol % or less. For example, ethylene carbonate is mixed in an amount of about 10 mol % with propylene carbonate to form a eutectic mixture, which lowers the melting point to −60° C. or less, increases the solubility and conductivity and improves the low-temperature characteristics.

MODE FOR INVENTION

The hybrid battery of the present invention will now be explained with reference to the following specific examples.

EXAMPLE 1

A capacitor was manufactured using $LiMn_2O_4$ as an anode active material and activated carbon having a capacity of 140

F/g and a specific surface area of 2,000 m²/g (MSP-20, Kansai Cokes) as a cathode active material.

Specifically, an anode was produced by mixing 75% of the anode active material, 15% of carbon black and 10% of PVDF as a binder to prepare a slurry, and coating the slurry to a thickness of 50 μm on both surfaces of a 20 mm-thick aluminum foil so that the anode had a total thickness of 120 μm. A cathode was produced by mixing 75% of the cathode active material, 15% of carbon black and 10% of CMC and PTFE as binders, and coating the mixture to a thickness of 100 μm on both surfaces of a 20 mm-thick aluminum foil so that the cathode had a total thickness of 220 μm. The electrodes were cut to a size of 3 cm×40 cm, wound in a cylindrical form, and placed in a can (18 mm (D)×40 mm (L)) to fabricate a cell.

As solutes of an electrolyte, 0.65 M lithium tetrafluoroborate ($LiBF_4$) and 0.05 M of lithium trifluoromethylsulfonimide ($LiN(CF_3SO_2)_2$) were used. As organic cationic salts, 0.6 M tetraethylammonium tetrafluoroborate ($(C_2H_5)_4NBF_4$) and 0.6 M butylmethylpyrrolidinium tetrafluoroborate ($(C_4H_9)(CH_3)(C_5H_{10}N)BF_4$) were used. As solvents of the electrolyte, 80 mol % of propylene carbonate and 20 mol % of ethylene carbonate were used.

EXAMPLE 2

A cell was fabricated in the same manner as in Example 1, except that $Li(Ni_{0.37}Co_{0.16}Mn_{0.37}Li_{0.1})O_2$ (3M Co.) was used instead of $LiMn_2O_4$ as an anode active material.

EXAMPLE 3

A cell was fabricated in the same manner as in Example 1, except that $Li(Ni_{1/3}Co_{1/3}Mn_{1/3})O_2$ (Seimi Co.) was used instead of $LiMn_2O_4$ as an anode active material.

The anode active materials of the hybrid batteries manufactured in Examples 1 to 3 were measured for initial capacity and resistance characteristics. The results are shown in Table 1. The capacity of the hybrid batteries was measured at an increment of 1 mA/F, and the resistance of the hybrid batteries was measured at 1 kHz.

TABLE 1

| | | Initial performance | |
|---|---|---|---|
| Example No. | Anode material | Capacity (F) | Resistance (mΩ) |
| Example 1 | $LiMn_2O_4$ | 160 | 30 |
| Example 2 | $Li(Ni_{0.37}Co_{0.16}Mn_{0.37}Li_{0.1})O_2$ | 220 | 37 |
| Example 3 | $Li(N_{1/3}Co_{1/3}Mn_{1/3}O_2)$ | 210 | 42 |

EXAMPLES 4 TO 7

Capacitors were manufactured using $Li(Ni_{0.37}Co_{0.16}Mn_{0.37}Li_{0.1})O_2$ as an anode active material and activated carbon having a capacity of 140 F/g and a specific surface area of 2,000 m²/g (MSP-20, Kansai Cokes) as a cathode active material.

Specifically, an anode was produced by mixing 75% of the anode active material, 15% of carbon black and 10% of PVDF as a binder to prepare a slurry, and coating the slurry to a thickness of 50 μm on both surfaces of a 20 mm-thick aluminum foil so that the anode had a total thickness of 120 μm. A cathode was produced by mixing 75% of the cathode active material, 15% of carbon black and 10% of CMC and PTFE as binders, and coating the mixture to a thickness of 100 μm on both surfaces of a 20 mm-thick aluminum foil so that the cathode had a total thickness of 220 μm. The electrodes were cut to a size of 3 cm×40 cm, wound in a cylindrical form, and placed in a can (18 mm (D)×40 mm (L)) to fabricate a cell.

As solutes of an electrolyte, 0.65 M lithium tetrafluoroborate ($LiBF_4$) and 0.05 M of lithium trifluoromethylsulfonimide ($LiN(CF_3SO_2)_2$) were used. As solvents of the electrolyte, 80 mol % of propylene carbonate and 20 mol % of ethylene carbonate were used.

As organic cations as solutes of the electrolyte, butylmethylpyrrolidinium (BMP) cations were used. The concentrations of the butylmethylpyrrolidinium cations were controlled 1.0 mol/L, 1.5 mol/L, 2.0 mol/L, and 2.5 mol/L.

Figure 2:
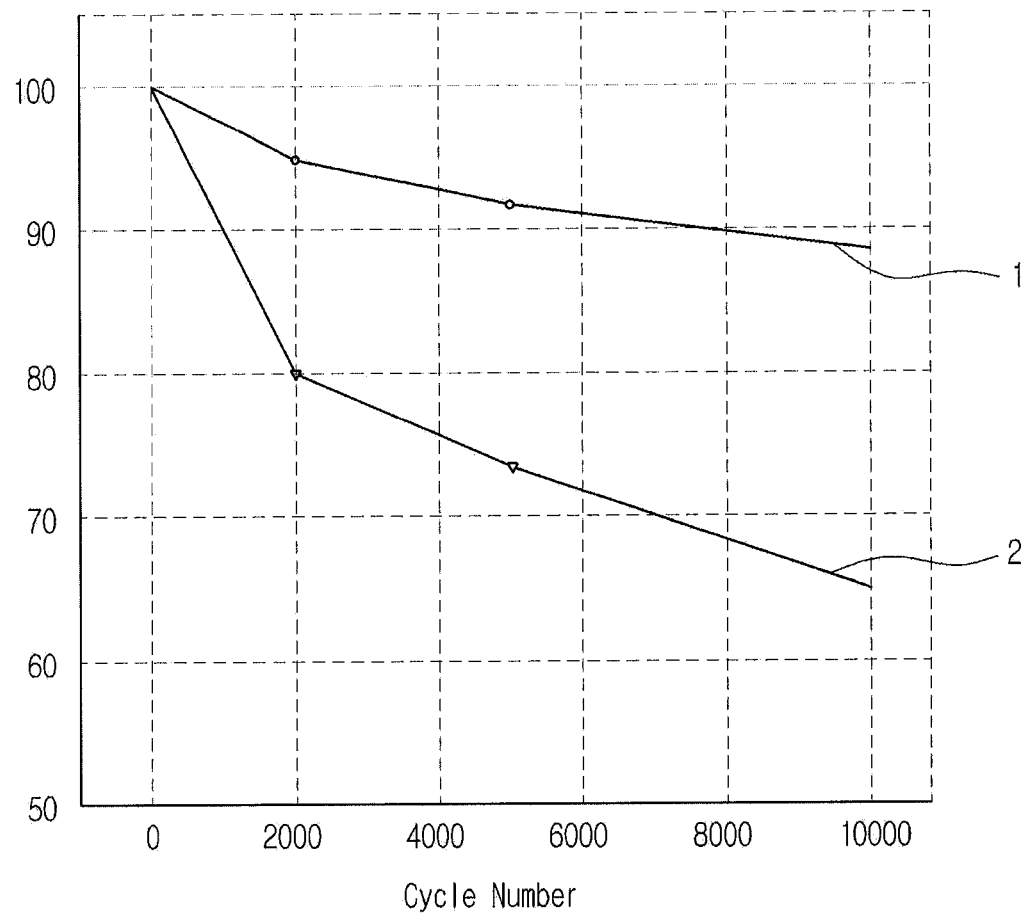
FIG. 2 is a graph showing changes in capacity according to the kind of electrolytes used in hybrid batteries under the test conditions shown in FIG. 1.

The capacity and the resistance of the hybrid batteries manufactured in Examples 4 to 7 were measured under the cycle test conditions shown in FIG. 2. The results are shown in Table 2. The cycle test was conducted by performing 20,000 cycles or more at a charge/discharge current of 20 mA/F, a working voltage of 2.5 V and a resistance of 1 kHz.

TABLE 2

| | | Initial performance | | Changes after 20,000 cycles | |
|---|---|---|---|---|---|
| Example No. | $BMP^+$ (mol/L) | Capacity (F) | Resistance (mΩ) | Decrease in capacity (%) | Increase in resistance (%) |
| Example 4 | 1.0 M | 200 | 29 | 29 | 80 |
| Example 5 | 1.5 M | 230 | 30 | 18 | 37 |
| Example 6 | 2.0 M | 230 | 33 | 17 | 35 |
| Example 7 | 2.5 M | 220 | 38 | 27 | 70 |

As can be seen from the results of Table 2, when the concentration of the butylmethylpyrrolidinium salt in the electrolyte was 1.5 mol/L, a decrease in capacity was 18% and an increase in resistance was 37%. When the concentration of the butylmethylpyrrolidinium salt in the electrolyte was 2.0 mol/L, a decrease in capacity was 17% and an increase in resistance was 35%. The results indicate that when the concentration of the butylmethylpyrrolidinium salt in the electrolytes was in the range of 1.5 to 2.0 mol/L, the decrease in capacity and the increase in resistance were considerably reduced, and superior cycle characteristics were stably maintained.

In contrast, when the concentration of the butylmethylpyrrolidinium salt in the electrolytes was 1.0 mol/L, a decrease in capacity was 29% and an increase in resistance was 80%. When the concentration of the butylmethylpyrrolidinium salt in the electrolyte was 2.5 mol/L, a decrease in capacity was 27% and an increase in resistance was 70%.

The results indicate that when the concentration of the butylmethylpyrrolidinium salt in the electrolytes was not higher than 1.0 mol/L or not lower than 2.5 mol/L, the decrease in capacity and the increase in resistance were further increased.

The results of Table 2 suggest that the organic cations are preferably used at a concentration ranging from 1.0 mol/L to 2.5 mol/L.

In addition, a mixture of pyrrolidinium cations and ammonium cations as organic cations could be used. In this case, the ammonium cations, which have a lower solubility and a lower conductivity than the pyrrolidinium cations, were used at a concentration not higher than 1.0 mol/L, and the pyrrolidinium cations were used in such an amount that the concentration of the mixture reached 1.0-2.5 mol/L. Alternatively, pyrrolidinium cations only could be used as organic cations without using ammonium cations. In this case, the pyrrolidinium cations were used at a concentration of 1.0-2.5 mol/L.

EXAMPLES 8 TO 11

Capacitors were manufactured using $LiMn_2O_4$ as an anode active material and activated carbon having a capacity of 140 F/g and a specific surface area of 2,000 $m^2$/g (MSP-20, Kansai Cokes) as a cathode active material.

Specifically, an anode was produced by mixing 75% of the anode active material, 15% of carbon black and 10% of PVDF as a binder to prepare a slurry, and coating the slurry to a thickness of 50 μm on both surfaces of a 20 mm-thick aluminum foil so that the anode had a total thickness of 120 μm. A cathode was produced by mixing 75% of the cathode active material, 15% of carbon black and 10% of CMC and PTFE as binders, and coating the mixture to a thickness of 100 μm on both surfaces of a 20 mm-thick aluminum foil so that the cathode had a total thickness of 220 μm. The electrodes were cut to a size of 3 cm×40 cm, wound in a cylindrical form, and placed in a can (18 mm (D)×40 mm (L)) to fabricate cells.

As solutes of an electrolyte, 0.65 M lithium tetrafluoroborate ($LiBF_4$) and 0.05 M of lithium trifluoromethylsulfonimide ($LiN(CF_3SO_2)_2$) were used. As organic cationic salts, 0.6 M tetraethylammonium tetrafluoroborate (($C_2H_5)_4NBF_4$) and 0.6 M butylmethylpyrrolidinium tetrafluoroborate (($C_4H_9)(CH_3)(C_5H_{10}N)BF_4$) were used.

As solvents of the electrolyte, propylene carbonate (PC) and ethylene carbonate (PC) were used. The proportions of the ethylene carbonate in the solvents of the electrolyte were controlled to 10%, 20%, 30% and 40%.

The capacity and the resistance of the hybrid batteries manufactured in Examples 8 to 11 were measured under the cycle test conditions shown in FIG. 2. The results are shown in Table 3. The cycle test was conducted by performing 20,000 cycles or more at room temperature, a charge/discharge current of 20 mA/F, a working voltage of 2.5 V and a resistance of 1 kHz. The capacity of the hybrid batteries at a low temperature (−25° C.) was measured at an increment of 1 mA/F, and the resistance of the hybrid batteries was measured at 1 kHz.

The hybrid battery manufactured in Example 8 in which a mixture of 90 mol % of propylene carbonate and 10 mol % of ethylene carbonate was used as a solvent of an electrolyte showed a decrease in capacity of 11% at a low temperature (25° C.), an increase in resistance of 470% at a low temperature (25° C.), a decrease in capacity of 23% after 20,000 cycles at room temperature, and an increase in resistance of 48% after 20,000 cycles at room temperature.

The hybrid battery manufactured in Example 9 in which a mixture of 80 mol % of propylene carbonate and 20 mol % of ethylene carbonate was used as a solvent of an electrolyte showed a decrease in capacity of 9% at a low temperature (25° C.), an increase in resistance of 380% at a low temperature (25° C.), a decrease in capacity of 23% after 20,000 cycles at room temperature, and an increase in resistance of 48% after 20,000 cycles at room temperature. The hybrid battery manufactured in Example 10 in which a mixture of 70 mol % of propylene carbonate and 30 mol % of ethylene carbonate was used as a solvent of an electrolyte showed a decrease in capacity of 10% at a low temperature (25° C.), an increase in resistance of 400% at a low temperature (25° C.), a decrease in capacity of 22% after 20,000 cycles at room temperature, and an increase in resistance of 44% after 20,000 cycles at room temperature. The hybrid battery manufactured in Example 11 in which a mixture of 60 mol % of propylene carbonate and 40 mol % of ethylene carbonate was used as a solvent of an electrolyte showed a decrease in capacity of 18% at a low temperature (25° C.), an increase in resistance of 550% at a low temperature (25° C.), a decrease in capacity of 20% after 20,000 cycles at room temperature, and an increase in resistance of 40% after 20,000 cycles at room temperature.

The results of Table 3 reveal that the decrease in capacity and the increase in resistance were reduced with increasing content of the ethylene carbonate mixed with the propylene carbonate. Particularly, when the ethylene carbonate content was 20 mol %, the decrease in capacity at a low temperature and the increase in resistance at a low temperature were lowest. These results are attributed to increased solvation of the Li ions and the electrolyte by the addition of ethylene carbonate. In addition, the increase in resistance at a low

TABLE 3

| Example No. | Solvent | | Initial performance | | Changes at low temperature(25° C.) | | Changes (%) after 20,000 cycles | |
|---|---|---|---|---|---|---|---|---|
| | PC (mol %) | EC (mol %) | C* (F) | R** (mΩ) | Decrease in capacity (%) | Increase in resistance (%) | Decrease in capacity (%) | Increase in resistance (%) |
| Ex. 1 | 100 | 0 | 160 | 30.0 | 13 | 500 | 25 | 55 |
| Ex. 8 | 90 | 10 | 162 | 29.0 | 11 | 470 | 23 | 48 |
| Ex. 9 | 80 | 20 | 162 | 28.5 | 9 | 380 | 23 | 48 |
| Ex. 10 | 70 | 30 | 163 | 28.0 | 10 | 400 | 22 | 44 |
| Ex. 11 | 60 | 40 | 163 | 28.0 | 18 | 550 | 20 | 40 |

Note:
C*—Capacity,
R**—Resistance

As is evident from the data shown in Table 3, the hybrid battery manufactured in Example 1 in which propylene carbonate only was used as a solvent of an electrolyte showed a decrease in capacity of 13% at a low temperature (25° C.), an increase in resistance of 500% at a low temperature (25° C.), a decrease in capacity of 25% after 20,000 cycles at room temperature, and an increase in resistance of 55% after 20,000 cycles at room temperature.

temperature was about four times higher than that the increase in resistance at room temperature, which is due to a decrease in the conductivity of the electrolytes at a low temperature and an increase in the total concentration by decreased solubility arising from the precipitation of salts.

From the results of Table 3, it could be concluded that a mixture of ethylene carbonate and a carbonate selected from carbonate-based solvents, such as propylene carbonate, is preferred as a solvent of an electrolyte. At this time, the selected carbonate and ethylene carbonate are preferably mixed in a molar ratio of 6:4 to 9:1. More preferably, the selected carbonate and ethylene carbonate are mixed in a molar ratio of about 8:2.

EXAMPLES 12 TO 14

Capacitors were manufactured using $LiMn_2O_4$ as an anode active material and activated carbon having a capacity of 140 F/g and a specific surface area of 2,000 $m^2$/g (MSP-20, Kansai Cokes) as a cathode active material.

Specifically, an anode was produced by mixing 75% of the anode active material, 15% of carbon black and 10% of PVDF as a binder to prepare a slurry, and coating the slurry to a thickness of 50 μm on both surfaces of a 20 mm-thick aluminum foil so that the anode had a total thickness of 120 μm. A cathode was produced by mixing 75% of the cathode active material, 15% of carbon black and 10% of CMC and PTFE as binders, and coating the mixture to a thickness of 100 μm on both surfaces of a 20 mm-thick aluminum foil so that the cathode had a total thickness of 220 μm. The electrodes were cut to a size of 3 cm×40 cm, wound in a cylindrical form, and placed in a can (18 mm (D)×40 mm (L)) to fabricate cells.

As a solute of an electrolyte, 0.7 M lithium tetrafluoroborate ($LiBF_4$) was used. As organic cationic salts, 0.6 M tetraethylammonium tetrafluoroborate (($C_2H_5)_4NBF_4$) and 0.6 M butylmethylpyrrolidinium tetrafluoroborate (($C_4H_9)(CH_3)(C_5H_{10}N)BF_4$) were used.

As solvents of the electrolyte, 80 mol % of propylene carbonate and 20 mol % of ethylene carbonate were used.

Lithium pentafluoroethylsulfonimide ($LiN(C_2F_5SO_2)_2$) was added to the electrolyte. At this time, the concentrations of the lithium pentafluoroethylsulfonimide were controlled to 0.025 mol/L, 0.05 mol/L, and 0.1 mol/L.

COMPARATIVE EXAMPLE 1

A cell was fabricated in the same manner as in Examples 12 to 14, except that 0.7 M lithium tetrafluoroborate ($LiBF_4$) only was used as a solute of an electrolyte without using an imide salt.

COMPARATIVE EXAMPLE 2

A cell was fabricated in the same manner as in Examples 12 to 14, except that 0.7 M lithium tetrafluoroborate ($LiBF_4$) and 0.2 mol/L lithium pentafluoroethylsulfonimide ($LiN(C_2F_5SO_2)_2$), which is an imide salt, were used as solutes of an electrolyte.

The capacity and resistance of the hybrid batteries manufactured in Examples 12 to 14 and Comparative Examples 1 and 2 were measured in accordance with a high-temperature performance test. Specifically, the high-temperature performance test was conducted by maintaining the hybrid batteries at a voltage of 2.3 V, a resistance of 1 kHz and a temperature of 60° C. for 1,000 hours, and measuring the capacity and resistance of the hybrid batteries.

As apparent from the results of Table 4, the hybrid battery manufactured in Comparative Example 1 in which lithium pentafluoroethylsulfonimide ($LiN(C_2F_5SO_2)_2$), which is an imide salt, was not added as a solute of the electrolyte showed a decrease in capacity of 25% after 1,000 hours and an increase in resistance of 25% after 1,000 hours.

The hybrid battery manufactured in Example 12 in which 0.025 mol/L lithium pentafluoroethylsulfonimide ($LiN(C_2F_5SO_2)_2$), which is an imide salt, was added as a solute of an electrolyte showed a decrease in capacity of 19% after 1,000 hours and an increase in resistance of 20% after 1,000 hours.

The hybrid battery manufactured in Example 13 in which 0.05 mol/L lithium pentafluoroethylsulfonimide ($LiN(C_2F_5SO_2)_2$), which is an imide salt, was added as a solute of an electrolyte showed a decrease in capacity of 17% after 1,000 hours and an increase in resistance of 20% after 1,000 hours. The hybrid battery manufactured in Example 14 in which 0.1 mol/L lithium pentafluoroethylsulfonimide ($LiN(C_2F_5SO_2)_2$), which is an imide salt, was added as a solute of an electrolyte showed a decrease in capacity of 20% after 1,000 hours and an increase in resistance of 23% after 1,000 hours.

The hybrid battery manufactured in Comparative Example 2 in which 0.2 mol/L lithium pentafluoroethylsulfonimide ($LiN(C_2F_5SO_2)_2$), which is an imide salt, was added as a solute of an electrolyte showed a decrease in capacity of 30% after 1,000 hours and an increase in resistance of 35% after 1,000 hours.

The results of Table 4 indicate that when lithium pentafluoroethylsulfonimide ($LiN(C_2F_5SO_2)_2$), which is an imide salt, was added at a concentration of 0.1 mol/L or lower as a solute of an electrolyte, the decrease in capacity and the increase in resistance were gradually lowered. Particularly, when the concentration of the lithium pentafluoroethylsulfonimide ($LiN(C_2F_5SO_2)_2$) was 0.05 mol/L, the decrease in capacity and the increase in resistance were lowest.

EXAMPLE 15

A cell was manufactured in the same manner as in Examples 12 to 14, except that $Li(Ni_{0.37}Co_{0.16}Mn_{0.37}Li_{0.1})O_2$ was used instead of $LiMn_2O_4$ as an anode active material and 0.05 mol/L trifluoromethylsulfonimide ($LiN(CF_3SO_2)_2$), which is an imide salt, was used as a solute of an electrolyte instead of pentafluoroethylsulfonimide ($LiN(C_2F_5SO_2)_2$).

COMPARATIVE EXAMPLE 3

A cell was manufactured in the same manner as in Example 15, except that 0.7 M lithium tetrafluoroborate ($LiBF_4$) was used as a solute of an electrolyte without the addition of an imide salt.

TABLE 4

| Example No. | $LiN(C_2F_5SO_2)_2$ (mol/L) | Initial Performance | | Changes after 1,000 hours | |
| --- | --- | --- | --- | --- | --- |
| | | Capacity (F) | Resistance (mΩ) | Decrease in capacity (%) | Increase in resistance (%) |
| Comparative Example. 1 | 0.0 | 160 | 32 | 25 | 25 |
| Ex. 12 | 0.025 | 161 | 30.5 | 19 | 20 |
| Ex. 13 | 0.05 | 162 | 30 | 17 | 20 |
| Ex. 14 | 0.1 | 163 | 28 | 20 | 23 |
| Comparative Example 2 | 0.2 | 163 | 28 | 30 | 35 |

COMPARATIVE EXAMPLE 4

A cell was manufactured in the same manner as in Example 15, except that 0.7 M lithium tetrafluoroborate ($LiBF_4$) was used and 0.01 mol/L lithium trifluoromethylsulfonimide ($LiN(CF_3SO_2)_2$), which is an imide salt, were used as solutes of an electrolyte.

The capacity and resistance of the hybrid batteries manufactured in Example 15 and Comparative Examples 3 and 4 were measured in accordance with a high-temperature performance test. Specifically, the high-temperature performance test was conducted by maintaining the hybrid batteries at a voltage of 2.3 V, a resistance of 1 kHz and a temperature of 60° C. for 1,000 hours, and measuring the capacity and resistance of the hybrid batteries.

TABLE 5

| Example No. | $LiN(C_2F_5SO_2)_2$ (mol/L) | Initial Performance | | Changes after 1,000 hours | |
|---|---|---|---|---|---|
| | | Capacity (F) | Resistance (mΩ) | Decrease in capacity (%) | Increase in resistance (%) |
| Comparative Example 1 | 0.0 | 220 | 40 | 27 | 30 |
| Example 12 | 0.05 | 224 | 37 | 18 | 18 |
| Example 13 | 0.01 | 226 | 36 | 35 | 50 |

As can be seen from the results of Table 5, the hybrid battery manufactured in Comparative Example 3 in which trifluoromethylsulfonimide ($LiN(CF_3SO_2)_2$), which is an imide salt, was not added as a solute of an electrolyte showed a decrease in capacity of 27% after 1,000 hours and an increase in resistance of 30% after 1,000 hours. The hybrid battery manufactured in Example 15 in which 0.05 mol/L lithium trifluoromethylsulfonimide ($LiN(CF_3SO_2)_2$), which is an imide salt, was added as a solute of an electrolyte showed a decrease in capacity of 18% after 1,000 hours and an increase in resistance of 18% after 1,000 hours.

The hybrid battery manufactured in Comparative Example 4 in which 0.01 mol/L lithium trifluoromethylsulfonimide ($LiN(CF_3SO_2)_2$), which is an imide salt, was added as a solute of an electrolyte showed a decrease in capacity of 35% after 1,000 hours and an increase in resistance of 50% after 1,000 hours.

The results of Table 5 indicate that when lithium trifluoromethylsulfonimide ($LiN(CF_3SO_2)_2$), which is an imide salt, was added at a concentration of 0.01 to 0.05 mol/L as a solute of an electrolyte, the decrease in capacity and the increase in resistance were gradually lowered. Particularly, when the concentration of the lithium trifluoromethylsulfonimide ($LiN(CF_3SO_2)_2$) was 0.05 mol/L, the decrease in capacity and the increase in resistance were lowest.

From the results of Tables 4 and 5, it could be concluded that an imide salt is preferably used at a concentration of 0.01 to 0.1 mol/L as a solute of an electrolyte.

EXAMPLES 16 TO 22

Cells were manufactured in the same manner as in Example 1, except that 0.6 M tetraethylammonium tetrafluoroborate ($(C_2H_5)_4NBF_4$) and 0.6 M butylmethylpyrrolidinium tetrafluoroborate ($(C_4H_9)(CH_3)(C_5H_{10}N)BF_4$) were used as organic cationic salts of an electrolyte, lithium tetrafluoroborate ($LiBF_4$) as a lithium salt was used at concentrations of 0.1 mol/L, 0.3 mol/L, 0.5 mol/L, 0.8 mol/L, 1.1 mol/L, 1.3 mol/L and 1.5 mol/L, and propylene carbonate was used as a solvent of the electrolyte.

Figure 6:
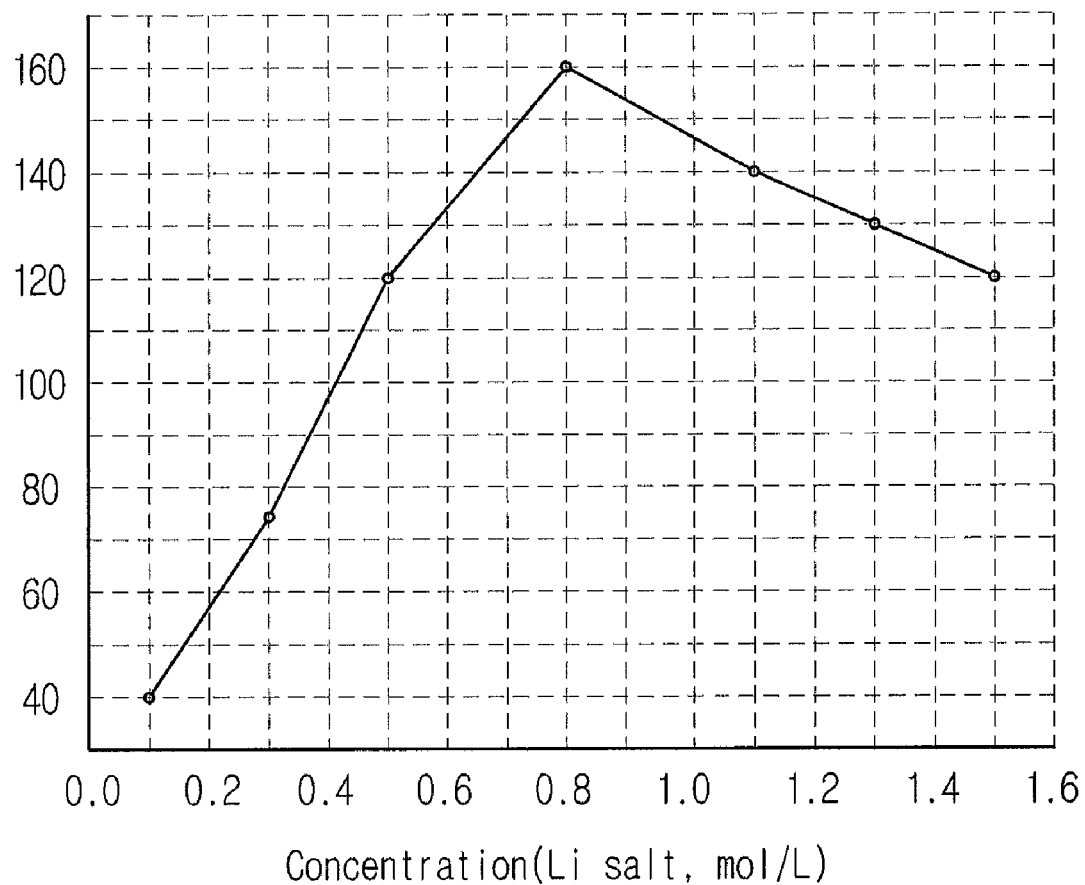
FIG. 6 is a graph showing changes in the capacitance of hybrid batteries manufactured in some Examples of the present invention.
Figure 7:
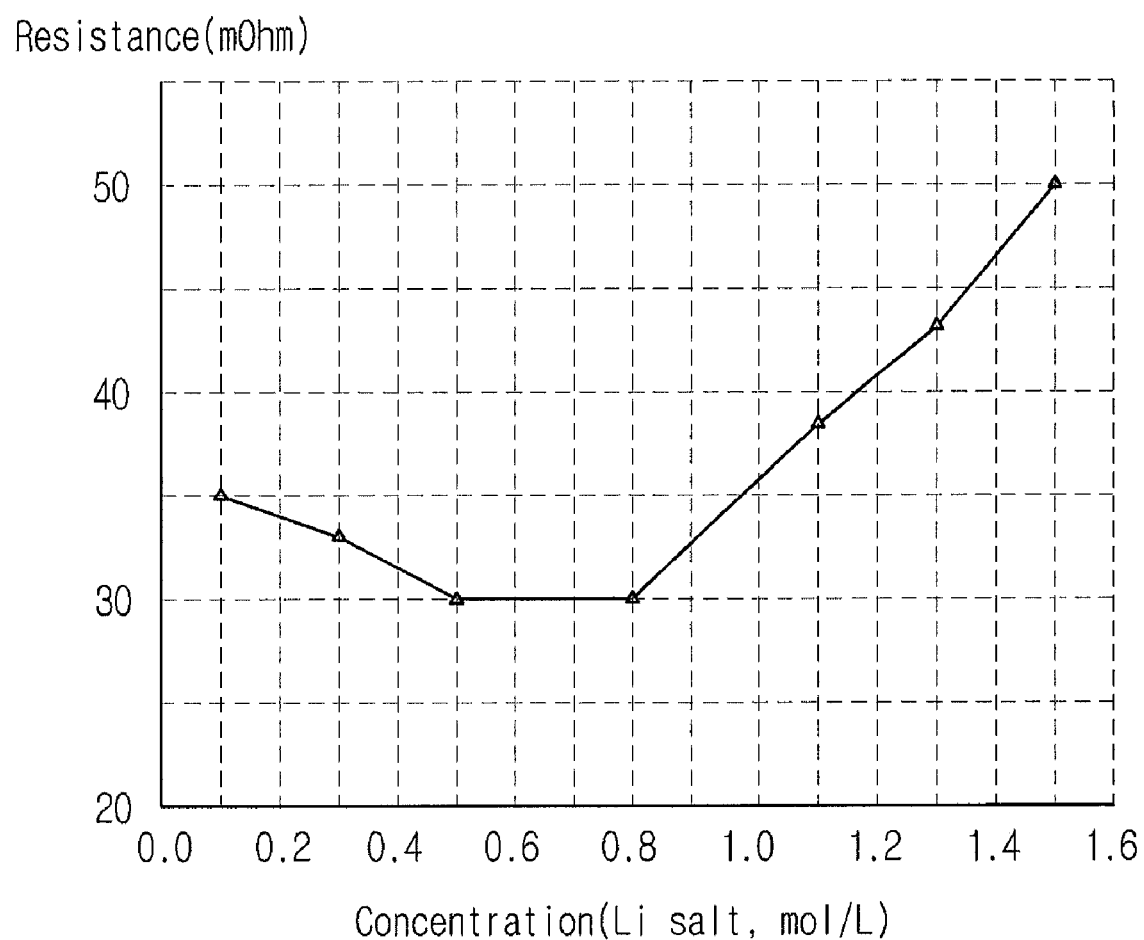
FIG. 7 is a graph showing changes in the resistance of hybrid batteries manufactured in some Examples of the present invention.

FIG. 6 is a graph showing changes in the capacitance of hybrid batteries manufactured in Examples 16 to 22 of the present invention, and FIG. 7 is a graph showing changes in the resistance of hybrid batteries manufactured in Examples 16 to 22 of the present invention. The anode active materials of the hybrid batteries manufactured in Examples 1 to 3 were measured for initial capacity and resistance characteristics. The results are shown in FIGS. 6 and 7. The capacity of the hybrid batteries was measured at an increment of 1 mA/F, and the resistance of the hybrid batteries was measured at 1 kHz.

Referring to FIGS. 6 and 7, it could be confirmed that when the lithium salts at concentrations of 0.5 to 0.8 mol/L were used as solute of electrolytes, the decrease in capacity and the increase in resistance were reduced. On the other hand, when the lithium salts at concentrations not lower than 0.8 mol/L were used as solutes of electrolytes, the decrease in capacity and the increase in resistance were increased, which made the cells unstable. When the lithium salts at concentrations not lower than 1.0 mol/L were used as solutes of electrolytes, the decrease in capacity and the increase in resistance were greatly increased.

Based on the results of FIGS. 6 and 7, it is preferred to control the concentration of the lithium salts to a maximum of 0.8 mol/L so that optimum cycle characteristics can be achieved.

As explained above, according to the hybrid batteries manufactured in Examples of the present invention, the cycle characteristics of the hybrid batteries could be improved by controlling the content of the lithium salt as a solute of an electrolyte to 0.8 mol/L and using the pyrrolidinium organic cations to increase conductivity and concentration required in the electrolyte.

In addition, the high-temperature stability of the hybrid batteries could be enhanced, the withstand voltage characteristics of the hybrid batteries could be improved, and the self-discharge rate of the hybrid batteries could be reduced by using the imide salt having high solubility and superior flowability in the electrolyte at a concentration not higher than 0.1 M.

Furthermore, the decrease in the capacity of the hybrid batteries and the increase in the resistance of the hybrid batteries could be reduced by mixing ethylene carbonate with at least one carbonate-based solvent having a high dielectric constant and a high conductivity as a solvent of an electrolyte to increase the concentration of the electrolyte.

Although the preferred embodiments of the present invention have been disclosed with reference to the accompanying drawings, the present invention may be embodied in different forms and is not to be construed as being limited to these embodiments. Those skilled in the art will appreciate that various modifications can be made to the present invention without changing the technical spirit and essential features of the invention. Therefore, it should be understood that the embodiments disclosed herein do not serve to limit the invention but are set forth for illustrative purposes only.

INDUSTRIAL APPLICABILITY

As apparent from the above description, the present invention provides a non-toxic and highly stable hybrid battery using an electrochemically stable electrolyte composition and electrodes suitable for use in the electrolyte composition, thereby achieving improved high-current charge/discharge characteristics.

In addition, the present invention provides a hybrid battery using a mixture of an ammonium salt and a pyrrolidinium salt, which are organic cationic salts, as solutes of an electrolyte to increase conductivity and concentration required in the electrolyte, thereby achieving improved cycle characteristics.

Furthermore, the present invention provides a hybrid battery using a highly soluble and highly flowable imide salt as a solute of an electrolyte, thereby achieving enhanced high-temperature stability, improved withstand voltage characteristics and reduced self-discharge rate.

Moreover, the present invention provides a hybrid battery using at least one carbonate-based solvent having a high dielectric constant and a high conductivity as a solvent of an electrolyte to increase the concentration of the electrolyte, so that a decrease in capacity and an increase in resistance can be reduced.

The invention claimed is:

1. A hybrid battery, comprising:
   an electrode unit including an anode and a cathode;
   a separator for electrically separating the anode and the cathode; and
   an electrolyte filled in a space between the anode and the cathode for forming an electric double layer on surfaces of the anode and cathode when a voltage is applied,
   wherein the electrolyte contains a mixture of a lithium salt, an ammonium salt, and a pyrrolidinium salt as solutes in a carbonate-based solvent so that the mixture has a concentration of 1.0-2.5 mol/L, and
   wherein the pyrrolidinium salt is butylmethylpyrrolidinium having a concentration of 1.5-2.0 mol/L.

2. The hybrid battery according to claim 1, wherein the electrolyte further contains an imide salt as the solutes of the electrolyte, and the imide salt is lithium pentafluoroethylsulfonimide ($LiN(C_2F_5SO_2)_2$) having a concentration of 0.1 mol/L.

3. The hybrid battery according to claim 1, wherein the electrolyte further contains an imide salt as the solutes of the electrolyte, and the imide salt is lithium trifluoromethylsulfonimide ($LiN(CF_3SO_2)_2$) having a concentration of 0.01-0.1 mol/L.

4. The hybrid battery according to claim 1, wherein the ammonium salt is at least one kind selected from the group consisting of ammonium salts, including tetraethylammonium tetrafluoroborate, tetraethylammonium hexafluoroborate, and tetraethylammonium perchlorate.

5. The hybrid battery according to claim 1, wherein the ammonium salt and the pyrrolidinium salt make up 50-90 mol % of the solutes.

6. The hybrid battery according to claim 1, wherein the ammonium salt and the pyrrolidinium salt are mixed in a molar ratio of 1:9 to 3:7.

7. The hybrid battery according to claim 1, wherein the carbonate-based solvent is selected from the group consisting of propylene carbonate (PC), ethylene carbonate (EC), dimethyl carbonate (DMC), diethyl carbonate (DEC), ethylmethyl carbonate (EMC), and mixtures thereof.

8. The hybrid battery according to claim 1, wherein the carbonate-based solvent includes 10-40 vol % of ethylene carbonate (EC).

9. The hybrid battery according to claim 1, wherein the lithium salt is at least one kind selected from lithium salts, including lithium tetrafluoroborate, lithium trifluoromethlysulfonimide, lithium perchlorate and lithium hexafluoroborate.

10. The hybrid battery according to claim 1, wherein the anode is made of a material selected from the group consisting of lithium manganate, lithium cobalt oxide and lithium nickel oxide, or is made of a material selected from the group consisting of composite metal oxides, including lithium nickel cobalt manganese oxide.

11. The hybrid battery according to claim 1, wherein the cathode is made of activated carbon having a capacitance of 100-300 F/g.

12. The hybrid battery according to claim 1, wherein a mixing molar ratio of the lithium salt to a sum of the ammonium salt and the pyrrolidinium salt is in the range of 0.1 to 0.7:0.9 to 1.8.

13. The hybrid battery according to claim 1, wherein the electrolyte further contains an imidazolium.

14. The hybrid battery according to claim 13, wherein the imidazolium is ethylmethylimidazolium tetrafluoroborate.

* * * * *